US012073816B2

(12) United States Patent
Headley

(10) Patent No.: US 12,073,816 B2
(45) Date of Patent: Aug. 27, 2024

(54) APPARATUS AND SYSTEM FOR DYNAMIC ENVIRONMENTALLY ACTUATED CEILING BAFFLE AND METHODS THEREOF

(71) Applicant: TURF DESIGN, INC., Gilberts, IL (US)

(72) Inventor: Dustin Headley, Hoffman Estates, IL (US)

(73) Assignee: TURF DESIGN, INC., Gilberts, IL (US)

( * ) Notice: Subject to any disclaimer, the term of this patent is extended or adjusted under 35 U.S.C. 154(b) by 223 days.

(21) Appl. No.: 17/588,596

(22) Filed: Jan. 31, 2022

(65) Prior Publication Data

US 2022/0246125 A1 Aug. 4, 2022

Related U.S. Application Data

(60) Provisional application No. 63/143,185, filed on Jan. 29, 2021.

(51) Int. Cl.

| | |
|---|---|
| ***E04B 9/04*** | (2006.01) |
| ***E04B 1/99*** | (2006.01) |
| ***E04B 9/00*** | (2006.01) |
| ***E04B 9/18*** | (2006.01) |
| ***E04B 9/24*** | (2006.01) |
| ***G10K 11/162*** | (2006.01) |

(52) U.S. Cl.

CPC ............ *G10K 11/162* (2013.01); *E04B 1/994* (2013.01); *E04B 9/003* (2013.01); *E04B 9/0414* (2013.01); *E04B 9/18* (2013.01); *E04B 9/247* (2013.01); *E04B 9/248* (2013.01)

(58) Field of Classification Search

CPC .......... E04B 1/994; E04B 1/84; E04B 1/8209; E04B 1/99; E04B 1/8409; E04B 1/8404; E04B 9/003; E04B 9/0414; E04B 9/247; E04B 9/248; E04B 2001/5414; E04B 2001/8423; E04B 2001/8476; E04B 2001/8428; E04B 2001/8442; E04B 2001/8452

See application file for complete search history.

(56) References Cited

U.S. PATENT DOCUMENTS

| | | | | |
|---|---|---|---|---|
| 2,160,638 A * | 5/1939 | Bedell | E04B 9/34 181/295 | |
| 2,542,428 A * | 2/1951 | Peik | E04B 1/8409 181/290 | |
| 4,197,923 A * | 4/1980 | Harris | E04B 9/34 181/291 | |

(Continued)

*Primary Examiner* — Kyle J. Walraed-Sullivan
(74) *Attorney, Agent, or Firm* — Patrick Sheldrake

(57) ABSTRACT

A dynamic environmentally actuated ceiling baffle and system that incorporates sidewalls with cuts or kerfs, top and bottom portions and sensors to automatically, programmatically and manually properly configure the ceiling baffle for optimal noise reduction based on the environment or the needs of the user, and that can be quickly and easily installed onto ceiling structures using integrated locks, cables or magnets, to produce a dynamic environmentally actuated ceiling baffle system, and to provide an aesthetically pleasing image, along with a reduction in unwanted noise and/or room acoustics, using the programmed or manual actuation to tune the ceiling baffle to respond appropriately to the acoustic need.

19 Claims, 4 Drawing Sheets

(56) References Cited

U.S. PATENT DOCUMENTS

| | | | | |
|---|---|---|---|---|
| 4,480,715 | A * | 11/1984 | Brooks | E04B 2/7429 428/167 |
| 4,722,760 | A * | 2/1988 | Shimada | B32B 27/304 428/167 |
| 5,077,949 | A * | 1/1992 | Kotter | E01F 8/007 52/630 |
| 6,467,228 | B1 | 10/2002 | Wendt et al. | |
| 7,690,158 | B2 * | 4/2010 | Kelly | E04B 2/7429 52/794.1 |
| 8,782,987 | B2 | 7/2014 | Kabatsi | |
| 9,779,715 | B1 * | 10/2017 | Seldal | B64C 1/40 |
| 10,359,163 | B1 * | 7/2019 | Hettwer | F21S 4/28 |
| 10,508,444 | B2 | 12/2019 | Gillette et al. | |
| 10,975,568 | B1 * | 4/2021 | Monier | G10K 11/162 |
| 11,532,295 | B1 * | 12/2022 | Monier | G10K 11/162 |
| 11,776,522 | B2 * | 10/2023 | Su | G10K 11/162 181/286 |
| 2005/0011150 | A1 | 1/2005 | Stackenwalt | |
| 2011/0146078 | A1 * | 6/2011 | Hauptman | E04B 1/32 29/897.3 |
| 2011/0232219 | A1 * | 9/2011 | Wilkinson, Jr. | E04B 9/366 52/474 |
| 2014/0262079 | A1 * | 9/2014 | Filko | E06B 9/326 160/311 |
| 2016/0289955 | A1 * | 10/2016 | Schmitz | E04B 1/62 |
| 2017/0107718 | A1 * | 4/2017 | Sato | E04B 1/94 |
| 2017/0260806 | A1 * | 9/2017 | Adams | H04W 52/0245 |
| 2017/0263235 | A1 * | 9/2017 | Elford | G10K 11/172 |
| 2018/0313081 | A1 * | 11/2018 | Alnakkar | E04B 9/366 |
| 2019/0186132 | A1 * | 6/2019 | Knoblauch | E04B 9/363 |
| 2019/0203466 | A1 * | 7/2019 | Mayer | E04B 9/04 |
| 2019/0338931 | A1 * | 11/2019 | Ross | F21S 8/066 |
| 2021/0054620 | A1 * | 2/2021 | Headley | E04B 1/8404 |
| 2022/0246125 | A1 * | 8/2022 | Headley | G10K 11/162 |
| 2022/0246126 | A1 * | 8/2022 | Headley | E04B 1/99 |
| 2022/0364362 | A1 * | 11/2022 | Monier | E04B 9/0414 |
| 2022/0372753 | A1 * | 11/2022 | Verlinde | E04B 9/0457 |
| 2023/0055540 | A1 * | 2/2023 | Bailey | E04B 9/18 |
| 2023/0093579 | A1 * | 3/2023 | Hettwer | E04B 9/005 181/284 |

* cited by examiner

APPARATUS AND SYSTEM FOR DYNAMIC ENVIRONMENTALLY ACTUATED CEILING BAFFLE AND METHODS THEREOF

CROSS-REFERENCE TO RELATED APPLICATIONS

This application claims priority to U.S. Provisional Patent Application No. 63/143,185, filed Jan. 29, 2021, entitled APPARATUS AND SYSTEM FOR DYNAMIC ENVIRONMENTALLY ACTUATED CEILING BAFFLE AND METHODS THEREOF, which is hereby incorporated by reference in its entirety as though fully set forth herein.

FIELD OF THE INVENTION a. Technical Field

The present disclosure relates to a dynamic environmentally actuated ceiling baffle apparatus and systems, along with the methods for manufacturing, installing and using the dynamic environmentally actuated ceiling baffles. In particular, the present disclosure relates to dynamic environmentally actuated ceiling baffles and systems that incorporate inputs from the system or users based on the environment, including room acoustics, to properly configure and reconfigure the dynamic environmentally actuated ceiling baffle to counter or respond to the environment, using the programmed or manual actuation to tune the ceiling baffle to respond appropriately to the acoustic need.

The present disclosure further relates to a manual, automatic and/or programmable dynamic environmentally actuated ceiling baffle apparatus and system, along with the methods described herein for manufacturing, installing and using the environmentally actuated ceiling baffles. In particular, the present disclosure relates to environmentally actuated ceiling baffles and systems that can be controlled manually, automatically and/or programmatically using system components and other structural elements, such as switches and remote controls, where necessary, to configure and reconfigure the ceiling baffle apparatus and systems, based on inputs from sensors, such as noise sensors based on the environment, including room acoustics, to allow for the manual, automatic and/or programmatic proper configuration and reconfiguration of the environmentally actuated baffle to counter or respond to the environment.

The present disclosure contemplates that each of the above-referenced dynamic environmentally actuated ceiling baffles and systems can be quickly and easily installed onto construction ceiling hangers and other ceiling structures, using integrated locks, cables or magnets, to produce a dynamic environmentally actuated ceiling baffle system, and to provide an aesthetically pleasing image, along with a reduction in unwanted noise and/or room acoustics.

The present disclosure further relates to a dynamic environmentally actuated ceiling baffle apparatus and systems, along with the methods for manufacturing, installing and using the dynamic environmentally actuated ceiling baffles configured using recycled polyester felt, polyethylene terephthalate ("PET" or "PET Felt"), in the preferred embodiment, although other materials may be used. The dynamic environmentally actuated ceiling baffle apparatus may include multiple sidewalls portions, top and bottom shaped portions, each integral with the other or by combining separate portions. The portions created in part or in whole by using a program to create cuts or kerfs in the portions at calculated locations to form the dynamic environmentally actuated ceiling baffle apparatus and system.

b. Background of Disclosure

In general terms, ceilings can be suspended or exposed. Suspended ceilings are usually hung at a distance below the structural members to hide mechanical and electrical equipment, along with electrical conduit, HVAC ducts, water pipes, sewage lines, lighting fixtures, and similar structures. In order to construct a suspended ceiling, a metal grid is suspended from the actual ceiling, usually by wires, and acoustical or similar tiles, are inserted and supported by the grid.

However, either for cost or design purposes, many designs provide that the mechanical and electrical equipment are to be seen and not hidden. In these designs, there is no dropped ceiling and the ceiling is left to be viewed from the floor. Although the exposed ceiling may be a function of the design appeal, quite often an exposed ceiling creates acoustic problems, especially in large industrial rooms. Sound from one area of the room, can be reflected off the ceiling and be heard in other areas of the room. If there are a lot of workers or machinery, the room can become quite loud.

In order to minimize excessive and/or unwanted sound generated because of the exposed ceiling, one solution is directed to the Hinged Ceiling Panel disclosed and claimed in U.S. Pat. No. 6,467,228, to Wendt et al., which is a ceiling panel pivotally attached to a suspended ceiling grid structure that pivots to allow access to the area above the grid. The hinged ceiling panel includes a hinge located on a first edge and grid-releasable flanges located on the remaining edges of the panel. The hinged ceiling panel is designed so that a single person can easily release the panel from the grid system and pivot it downwards whereby the hinge supports it. The hinged ceiling panel is also designed so that an individual can also reposition the panel within the grid structure without the aid of others.

Another example of a baffle that is used to minimize excessive and/or unwanted sound generated because of the exposed ceiling, discloses hanging baffles from the ceiling at certain intervals to allow for the exposed ceiling to be viewed, but to reduce the acoustic profile. The Supported Architectural Structure in U.S. Pat. No. 8,782,987, to Kabatsi et al., which discloses a plurality of primary supports configured to couple with one or more architectural structures, and a plurality of flexible fins are incorporated into the structure using primary supports, secondary supports and attachment points.

Another example of such a ceiling structure is the Clipped Decorative Structure, U.S. patent application Ser. No. 10/774,233, to Stackenwalt et al., which discloses a decorative structure, which may be curved, suspended within a space and which includes a panel fastened to a support structure by a clip, a portion of which extends along a face of the panel.

These examples utilize additional supports, attachment hardware and clips to assist in suspending the flexible fins or decorative panels to the ceiling or to ceiling structure. However, none of these structures or any other that Applicant is currently aware of, provide a dynamic environmentally actuated ceiling baffle, or any type of baffle that is automatically, programmatically, or manually actuated based on environmental surroundings, such as room acoustics, and including the use of sensors, when necessary, to provide input for configuring and reconfiguring the dynamic ceiling baffle to optimize performance.

As such, there is a need for a dynamic environmentally actuated ceiling baffle apparatus and systems, along with the methods for manufacturing, installing and using the dynamic environmentally actuated ceiling baffles, wherein the ceiling baffles provide for automatic, programmatic, and/or manual configuring and reconfiguring the dynamic ceiling baffle to optimize performance based on environmental surroundings. There is also a need for these baffles and systems to be configured to be quickly and easily installed onto existing construction ceiling hangers or support structures, in many cases, without the need for tools, separate attachment devices, clips or the like. There is also a need for a dynamic environmentally actuated ceiling baffle apparatus and system that is an aesthetically pleasing image, and that reduces unwanted noise or room acoustics.

The foregoing is intended only to illustrate the present technical field and background art and should not be taken as a limitation or disavowal of claim scope.

BRIEF SUMMARY OF THE DISCLOSURE

The present disclosure relates to a dynamic environmentally actuated ceiling baffle apparatus and systems, along with the methods for manufacturing, installing and using the dynamic environmentally actuated ceiling baffles. In particular, the present disclosure relates to dynamic environmentally actuated ceiling baffles and systems that incorporate inputs from the system or users based on the environment, including room acoustics, to properly configure and reconfigure the dynamic environmentally actuated ceiling baffle to counter or respond to the environment, including to reduce unwanted noise.

The present disclosure further relates to an automatic dynamic environmentally actuated ceiling baffle apparatus and system, along with the methods for manufacturing, installing and using the automatic environmentally actuated ceiling baffles. In particular, the present disclosure relates to environmentally actuated ceiling baffles and systems that can be controlled automatically using system components, along with external devices, such as noise generators, when necessary, for configuring and reconfiguring the ceiling baffle system, based on inputs from sensors, such as noise sensors based on the environment, including room acoustics, to automatically and properly configure and reconfigure the environmentally actuated baffle to counter or respond to the environment.

Additionally, the present disclosure further relates to a manual dynamic environmentally actuated ceiling baffle apparatus and system, along with the methods for manufacturing, installing and using the manual environmentally actuated ceiling baffles. In particular, the present disclosure relates to a manual environmentally actuated ceiling baffles and systems that can be controlled by the user with manual system components, such as switches electrically coupled or wirelessly coupled to the ceiling baffle apparatus, to allow manual settings for configuring and reconfiguring the manual dynamic environmentally actuated baffle to counter or respond to the environment.

The present disclosure further relates to a programmable dynamic environmentally actuated ceiling baffle apparatus and systems, along with the methods for manufacturing, installing and using the programmable dynamic environmentally actuated ceiling baffles. In particular, the present disclosure relates to a programmable dynamic environmentally actuated ceiling baffles and systems that incorporate system components and programmatic control to properly configure and reconfigure the dynamic environmentally actuated baffle based on the program, to configure and reconfigure the dynamic environmentally actuated ceiling baffles and systems based on, for example, the day of the week or the time of the day, etc., to counter or respond to the environment.

The present disclosure contemplates that each of the above-referenced dynamic environmentally actuated ceiling baffles can be quickly and easily installed onto construction ceiling hangers and other ceiling structures, using integrated locks, cables or magnets, to produce a manual, automatic or programmable dynamic environmentally actuated baffle system, and to provide an aesthetically pleasing image, along with a reduction in unwanted noise and/or room acoustics.

The present disclosure further relates to a dynamic environmentally actuated ceiling baffle apparatus and systems, along with the methods for manufacturing, installing and using the dynamic environmentally actuated ceiling baffles configured using recycled polyester felt, polyethylene terephthalate ("PET" or "PET Felt"), and in the preferred embodiment, including the sidewalls, top and bottom shaped portions.

The present disclosure further contemplates that although felt or PET Felt is the preferred material due to acoustic, weight and environmental aspects, the present dynamic environmentally actuated ceiling baffle apparatus disclosure can incorporate any material in the manufacture of the baffle apparatus, including plastic, wood, metal, etc. The dynamic environmentally actuated ceiling baffle apparatus can also incorporate numerous materials in the same design. For example, the sidewalls could be manufactured using PET Felt and the system components could incorporate metal or wood, or another material. Other possibilities exist for mixing materials.

The present disclosure is an improved dynamic environmentally actuated ceiling baffle that utilizes kerfs or cuts in the sidewall, top and bottom portions to facilitate the configuring and reconfiguring of the ceiling baffle into the optimal shape to respond to the environment, including for reduction in unwanted noise and/or unwanted room acoustics. The optimal shape of the dynamic environmentally actuated ceiling baffle, from fully expanded (largest air gap) to fully collapsed (smallest or no air gap), is quickly created or generated due to the placement of the kerfs, which can be accomplished during the design of the particular dynamic environmentally actuated ceiling baffle. The improved dynamic environmentally actuated ceiling baffle can be quickly and easily installed onto construction ceiling hangers and ceiling structures, as described herein, and once installed can be configured and reconfigured based on the environment and changing conditions. The installation methods are described in detail in U.S. Pat. No. 10,508,444, which is incorporated in its entirety by reference herein.

The present disclosure further relates to a program used to create the dynamic environmentally actuated ceiling baffle designs by determining where the cuts and kerfs are to be located for the particular or specialized design. The system uses the program that determines or calculates the size of the dynamic environmentally actuated ceiling baffle needed for a particular room, the size of the sidewalls, top and bottom portions, and the location of the kerfs in the sidewalls, top and bottom portions. The kerf placement will determine the location that the dynamic environmentally actuated ceiling baffle will bend or flex to create the optimal ceiling baffle and air gap size for the particular environment. Additionally, the program can also determine the size of the particular kerfs depending on the amount of bending or distance that a particular sidewall must travel to obtain the optimal configuration. These design and manufacturing processes and methods are described in detail in US Patent Publication No. 20210054620, which is incorporated in its entirety by reference herein.

In use, the program can accept the particular dynamic environmentally actuated ceiling baffle design input, partly from the information pertaining to the room size and acoustic range. The information provided to the program may also include where the particular dynamic environmentally actuated ceiling baffle apparatus will be placed in relation to others in the system as a whole. Using that information, the program can calculate or determine the specific location and size of the kerfs necessary to be cut into the sidewalls to facilitate the creation or manufacture of the sidewalls, top and bottom portions of the dynamic environmentally actuated ceiling baffle.

Once the program has determined where the kerfs and cutouts are to be located to form the sidewalls, top and bottom portions, and the correct kerf sizes for optimizing the design, a computer numeric control or CNC machine can cut the kerfs out of the material to create the sidewalls, top and bottom portions. Of course, the dynamic environmentally actuated ceiling baffle can be an integral device made from a single sheet of material using the process described herein, but may also be configured from multiple pieces that are combined in a process to create a similar apparatus. Alternatively, the dynamic environmentally actuated ceiling baffle may be manufactured using a combination of the two processes.

Once the dynamic environmentally actuated ceiling baffle is manufactured, regardless of the method of attaching the dynamic environmentally actuated ceiling baffle to the ceiling structure, a cable can be attached to the inside bottom of the dynamic environmentally actuated ceiling baffle, such that when the cable is retracted or withdrawn, the bottom portion of the dynamic environmentally actuated ceiling baffle will move towards the top portion thereby creating an air gap as the sidewall portions begin to bend. As more cable is taken up, the dynamic environmentally actuated ceiling baffle will move to the largest air gap and theoretically the most optimal position for the environment. Conversely, as more cable is let out, the bottom portion will move away from the top portion, and at the furthest distance, the dynamic environmentally actuated ceiling baffle will have collapsed and reduced or eliminated the air gap.

By using noise generators including white noise and pink noise generators along with inputs from various sensors, the optimal position, including a particular air gap, can be determined and returned to when necessary, such as when the room is full of people in a meeting environment. The dynamic environmentally actuated ceiling baffle can be returned to another configuration, maybe with a smaller air gap when there are less people in the room, depending on the particular needs. Additionally, the reconfiguration of the dynamic environmentally actuated ceiling baffle can be done in a manual process or a programmable process, for example at 2:00 each Wednesday for a team meeting.

Additional objectives and advantages of the present disclosure will become apparent to one having ordinary skill in the art after reading the specification in light of the drawing figures, however, the spirit and scope of the present invention should not be limited to the description of the embodiments contained herein.

DETAILED DESCRIPTION

As stated herein, the objective of the present disclosure is to provide an improved dynamic environmentally actuated ceiling baffle, and an improved dynamic environmentally actuated ceiling baffle system, along with improved methods for manufacturing and installing the ceiling baffles and creating the dynamic environmentally actuated ceiling baffle system.

Figure 1:
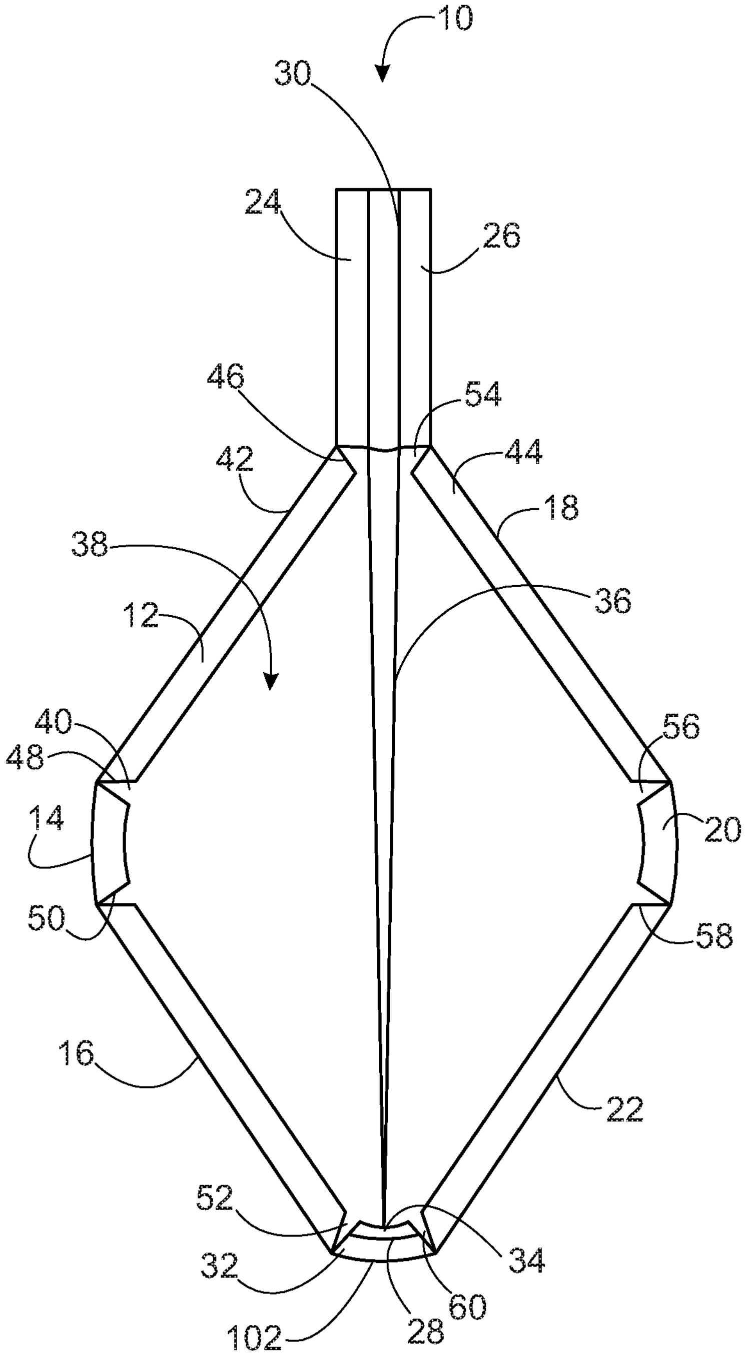
FIG. 1 is a side view of a dynamic environmentally actuated ceiling baffle apparatus incorporating an expanded air gap in accordance with the present disclosure.
Figure 2:
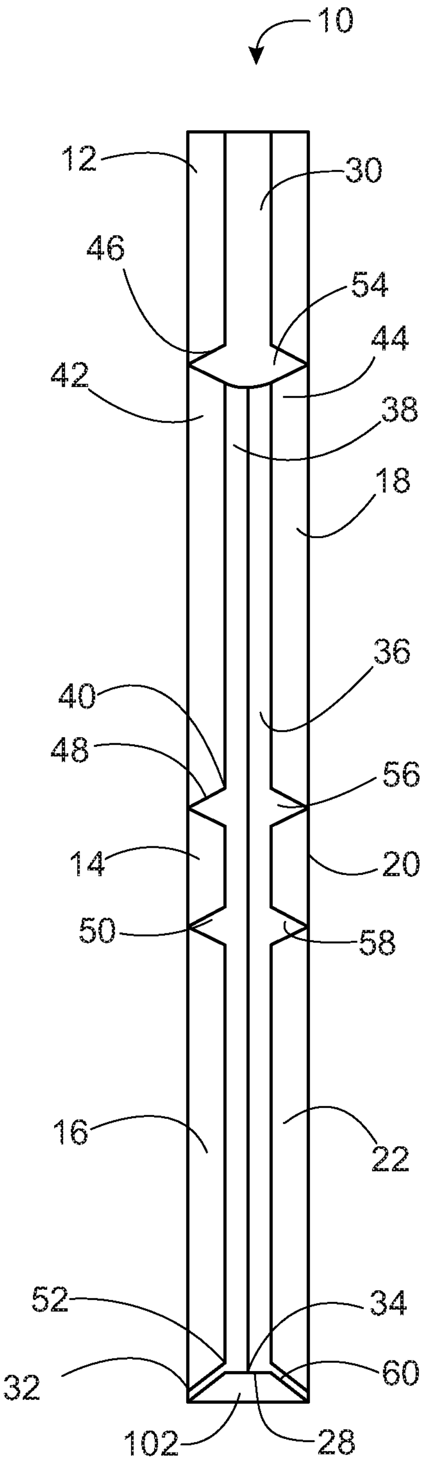
FIG. 2 is a side view of a dynamic environmentally actuated ceiling baffle apparatus incorporating a collapsed air gap in accordance with the present disclosure.

Referring to the drawings, wherein like reference numerals refer to the same or similar features in the various views, FIGS. 1 through 5 show different views of the improved dynamic environmentally actuated ceiling baffle 10 in the preferred embodiment. FIGS. 1 and 2 show side views of the dynamic environmentally actuated ceiling baffle 10 of the present disclosure, which in the preferred embodiment comprises a first upper sidewall 12, a first middle sidewall 14 and a first lower sidewall 16. The dynamic environmentally actuated ceiling baffle 10 also comprises a second upper sidewall 18, a second middle sidewall 20 and a second lower sidewall 22. In alternative embodiments, there may not be a need for a first and second middle sidewall 14, 20.

The dynamic environmentally actuated ceiling baffle 10 further comprises a first top portion 24, a second top portion 26 and a bottom portion 28, along with and actuator adjusting device 30, a bottom portion connection 32, a bottom portion stabilizer 34, and a configuration cable 36. The interior portion of the dynamic environmentally actuated ceiling baffle 10 is the air gap 38, which expands and collapses as the dynamic environmentally actuated ceiling baffle 10 is configured and reconfigured depending on the needs of the room in response to the environment.

The dynamic environmentally actuated ceiling baffle 10, which is made in the preferred embodiment, from a sheet or sheets of nine (9) millimeter polyester felt or PET Felt, is intended to be approximately eleven and a three-quarters (11.75) inches high and approximately twenty-seven (27) mm wide in the collapsed (no or reduced air gap 38) state. The dynamic environmentally actuated ceiling baffle 10 is also intended to be approximately six (6) inches high and approximately nine and a half (9.5) inches wide when fully extended. The optimal air gap 38 may be somewhere in between these two configurations. PET Felt is used in the preferred embodiment due to its beneficial acoustic, weight and environmental properties.

However, almost any material can be used to produce the first and second upper, middle and lower sidewalls 12, 14, 16, 18, 20, 22, and/or the first and second top portions 24, 26, and the bottom portion 28. Thus, the dynamic environmentally actuated ceiling baffle 10 of the present invention can be manufactured out of plastic, wood, metal, and other materials. Additionally, the dynamic environmentally actuated ceiling baffle 10 design can incorporate different materials in the same design, such as sidewalls 12, 14, 16, 18, 20, 22 of PET Felt, and the top and bottom portions 24, 26, 28 made of wood, as an example. Other possibilities exist for mixing materials.

In order to allow for the dynamic environmentally actuated ceiling baffle 10 to be configured and reconfigured from the completely expanded position (FIG. 1) to the completely collapsed position (FIG. 2), the dynamic environmentally actuated ceiling baffle 10 is modified with kerfs or cuts 40. The kerfs 40 are incorporated in particular locations and at particular angles to allow the dynamic environmentally actuated ceiling baffle 10 to be configured and reconfigured as described herein. The description of locating and utilizing cuts and kerfs for flexing and bending baffle walls and sidewalls is described in detail in US Patent Publication No. 20210054620, which is incorporated in its entirety by reference herein.

For a non-limiting example, FIG. 1 shows a side view of a portion of a dynamic environmentally actuated ceiling baffle 10 with various kerfs 40 in partial folded position during the expanding of the dynamic environmentally actuated ceiling baffle 10. In other words, the drawing in of the configuration cable 36, results in the raising of the bottom portion connector 32, bottom portion stabilizer 34, and thus the bottom portion 28, up towards the first and second top portions 24, 26.

To accomplish this step, four kerfs 40 are located and sized on the first sidewall 42 and four kerfs 40 are located and sized on the second sidewall 44. The four kerfs 40 on the first sidewall 42 comprise the first top kerf 46, the first upper middle kerf 48, the first lower middle kerf 50 and the first bottom kerf 52. The four kerfs 40 on the second sidewall 44 comprise the second top kerf 54, the second upper middle kerf 56, the second lower middle kerf 58 and the second bottom kerf 60.

As can be understood, as the configuration cable 36 is reeled in, the particular kerfs 40 allow the first and second sidewall portions 42, 44 to bend into the correct configuration to change the air gap 38 and change the dynamic response of the dynamic environmentally actuated ceiling baffle 10. Of course this is the preferred embodiment as there are numerous other configurations that can be incorporated using less or more sidewalls, and less or more kerfs.

The kerfs 40 can be straight cuts creating square or rectangular cuts into the first and second sidewall portions 42, 44. Additionally, the kerfs 40 can be angled thereby creating upside down triangle cuts into the first and second sidewall portions 42, 44. Either way, the kerfs 40 configured in the sidewall portions 42, 44 facilitate the flex or bend of the sidewall portion 42, 44 in either direction. The kerfs 40 can be the same size or different sizes, as different size kerfs 40 will allow for different range of bending of the first and second sidewall portions 42, 44.

Continuing with the non-limiting example, FIG. 2 shows a side view of the various kerfs 40 in an unfolded position during the collapsing of the dynamic environmentally actuated ceiling baffle 10. In other words, the releasing of the configuration cable 36 out, and the bottom portion connector 32, bottom portion stabilizer 34, and thus the bottom portion 28, moving down away from the first and second top portions 24, 26, and collapsing the dynamic environmentally actuated ceiling baffle 10 and minimizing the air gap 38.

Figure 3:
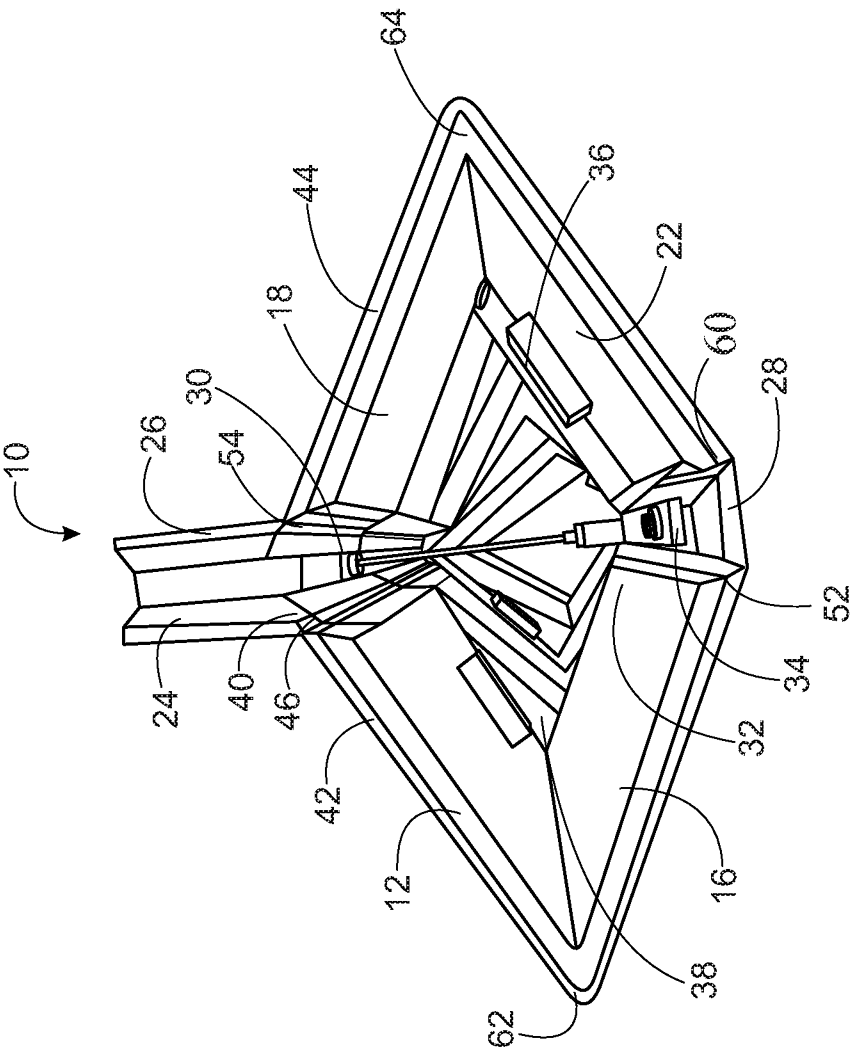
FIG. 3 is a side view of a dynamic environmentally actuated ceiling baffle apparatus in accordance with the present disclosure.

FIG. 3 shows a side view of an alternative embodiment dynamic environmentally actuated ceiling baffle 10. Although similar to the preferred embodiment dynamic environmentally actuated ceiling baffle 10 in FIG. 1, the alternative embodiment shows a dynamic environmentally actuated ceiling baffle 10 in which the first and second middle sidewalls 14, 20 are removed. As such, instead of a first upper middle kerf 48 and a first lower middle kerf 50, there is only a first middle kerf 62. Similarly, instead of a second upper middle kerf 56 and a second lower middle kerf 58, there is only a second middle kerf 64. As such, the configuration of the dynamic environmentally actuated ceiling baffle 10 is a little different than in the preferred embodiment.

Also shown in FIG. 3 are the components that make up the dynamic environmentally actuated ceiling baffle 10, including the first top portion 24, second top portion 26, bottom portion 28, actuator adjusting device 30, bottom portion connection 32, bottom portion stabilizer 34, and configuration cable 36. FIG. 3 shows the interior portion of the dynamic environmentally actuated ceiling baffle 10, the air gap 38, which expands and collapses as the dynamic environmentally actuated ceiling baffle 10 is configured and reconfigured depending on the needs of the room and in response to the environment. The air gap 38 creates the acoustic properties of the dynamic environmentally actuated ceiling baffle 10.

Figure 4:
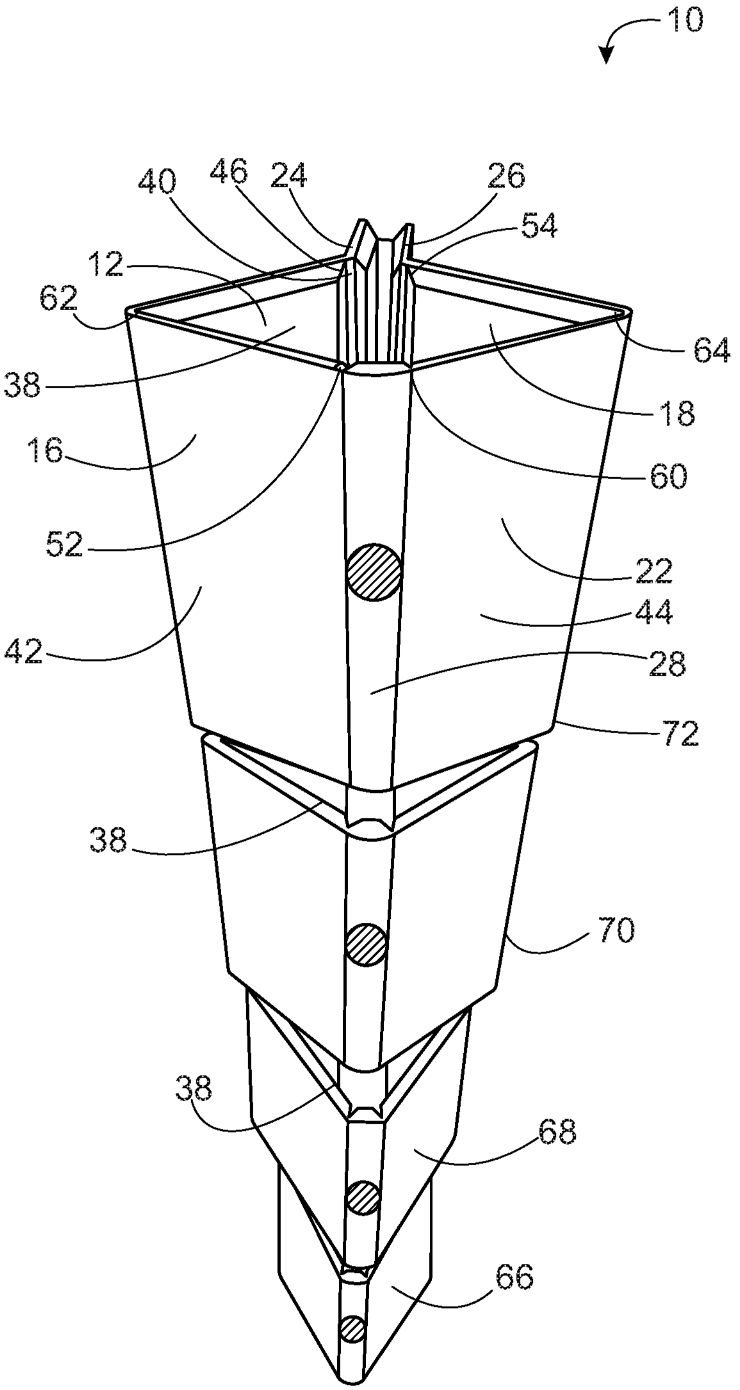
FIG. 4 is a bottom view of a dynamic environmentally actuated ceiling baffle apparatus in accordance with the present disclosure.

FIG. 4 shows the bottom view of the dynamic environmentally actuated ceiling baffle 10, or what will be seen from the floor looking up at the ceiling, in different stages of configuration. From the floor, the first lower sidewall 16, bottom portion 28 and second lower sidewall 22 are clearly visible. Depending on the configuration, the first upper sidewall 12 and second upper sidewall 18 may also be visible. From the back of FIG. 4, four different sections of the dynamic environmentally actuated ceiling baffle 10 are shown in various configurations from mostly collapsed configuration 66, to less collapsed configuration 68, to more expanded configuration 70, to mostly expanded configuration 72. Other configurations of more or less collapsed or expanded can be generated by releasing or letting out or drawing in the configuration cable 36.

The dynamic environmentally actuated ceiling baffle 10 can be configured into numerous shapes and designs in accordance with the present disclosure. The first and second sidewall portions 42, 44 can be divided out into many different section and sizes with various kerfs 40 to generate many different shapes and different shaped air gaps 38, within the scope of the present disclosure.

By using a program, as detailed herein, the proper kerf 40 size and location can be calculated to be carved out in the first and second sidewall portions 42, 44, along with the first and second top portions 24, 26 and bottom portion 28. Once all the kerfs 40 are known and/or calculated, the program can determine the optimal cut design thereby reduce material waste. Once the program is converted for use with a CNC machine, the CNC machine can make the necessary cuts for the dynamic environmentally actuated ceiling baffle 10, so that when the configuration cable is pulled or released, the dynamic environmentally actuated ceiling baffle 10 will be configured and reconfigured, as necessary. As such, using the program and a CNC machine, a user can design a dynamic environmentally actuated ceiling baffle 10 and have the sidewall portions correctly cut in a very short time.

As described herein, the material used in the preferred embodiment is polyester felt and is 99% recycled. Maintenance includes occasional vacuuming to remove particulate matter and air-borne debris or dust. Compressed air can be used to dust off the material in difficult to reach areas and for large assemblies.

The felt comes in numerous colors, including white, cream, light grey, light brown, brown, matte grey, charcoal, black, yellow, mango, orange, red, lavender, lime, green, light blue and dark blue. Of course, the dynamic environmentally actuated ceiling baffle 10 can be manufactured in many other colors and the present disclosure is not limited to these specifications and colors, as these are merely the specifications and colors for the preferred embodiments and alternative embodiments.

An alternative embodiment for installing the dynamic environmentally actuated ceiling baffle 10 includes using magnets (not shown) embedded into the dynamic environmentally actuated ceiling baffle 10 so that when assembled, the embedded magnets will hold the dynamic environmentally actuated ceiling baffle 10 to a standard ceiling structure (not shown) or to any metal material.

Figure 5:
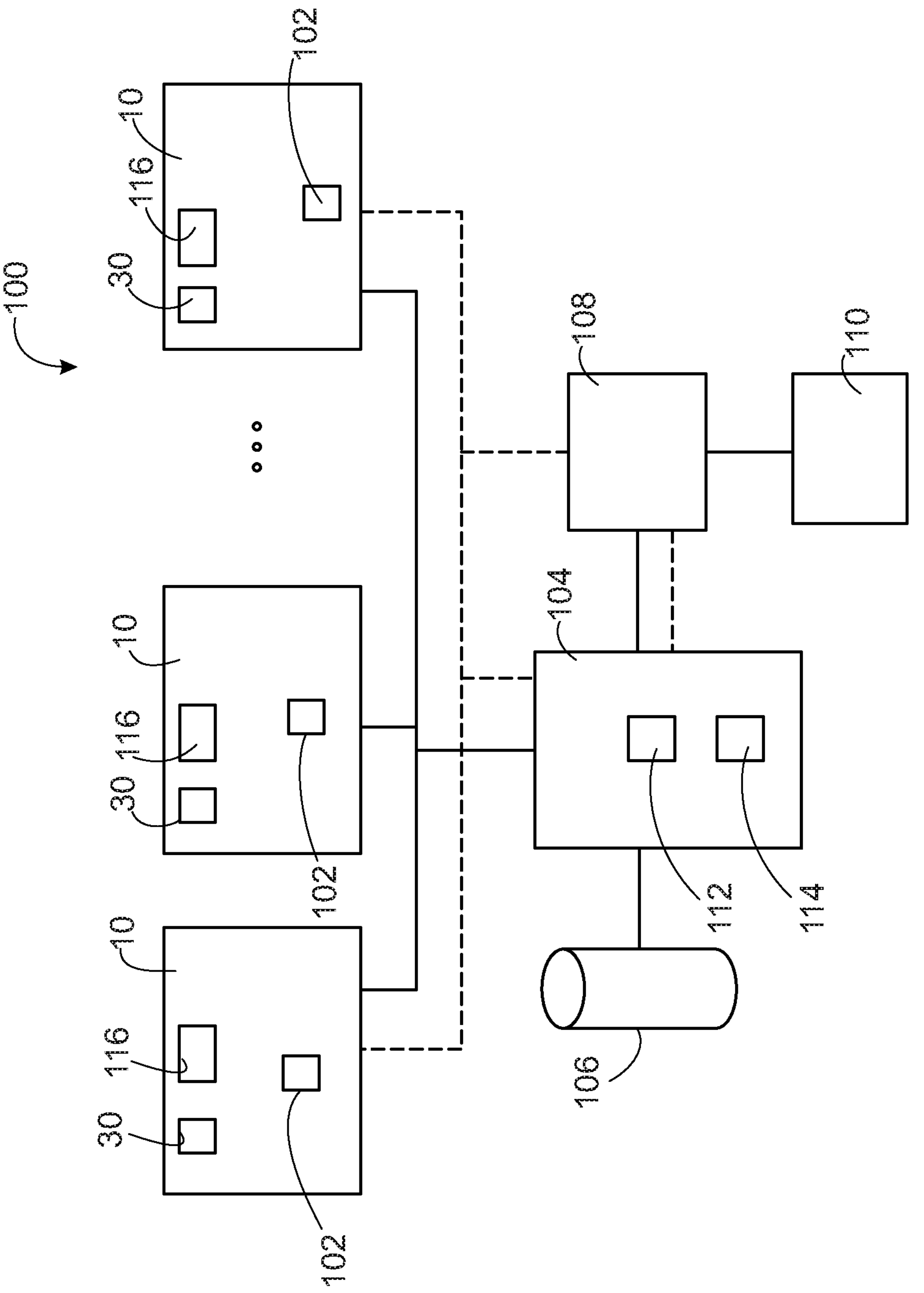
FIG. 5 is a functional block diagram for automatic or programmatic configuration for a dynamic environmentally actuated ceiling baffle apparatus in accordance with the present disclosure.

FIG. 5 is an exemplary functional block diagram of the dynamic environmentally actuated ceiling baffle 10 incorporating utilizing environmental sensors along with a computer or processor system to control the dynamic environmentally actuated ceiling baffle 10 to provide an aesthetically pleasing image, along with a desired reduction in unwanted noise or room acoustics, based on the surrounding environment. As such, the present disclosure further comprises custom software and a graphical user interface (GUI) that allows the system to automatically or near-automatically control one or more of the dynamic environmentally actuated ceiling baffle 10.

Similar to the manual control of the environmentally actuated ceiling baffle 10, the automatic and programmatic control of the environmentally actuated ceiling baffles 10 allow for the reduction in unwanted noise or room acoustics using one or more sensors, such as noise sensors. Along those lines, the present invention contemplates the ability to sense the room acoustics and automatically adjust the environmentally actuated ceiling baffles 10 as needed to reduce room acoustics. Additionally, the present invention contemplates the need for programmatically controlling the dynamic environmentally actuated ceiling baffle 10 in a repeating process, such as day of the week and time of the day, or a process based on the environment, such as when the room environment exceeds a particular or predetermined decibel level. At that time or level, the dynamic environmentally actuated ceiling baffle 10 will reconfigure itself as needed to reduce room acoustics.

As a non-limiting example, FIG. 5 shows a block diagram view of an exemplary environmentally actuated ceiling baffle system 100 utilizing multiple dynamic environmentally actuated ceiling baffles 10 for reducing unwanted room noise. Each dynamic environmentally actuated ceiling baffle 10 can work alone or in conjunction with the other environmentally actuated ceiling baffles 10 to reduce noise to a particular section of the room, or to reduce overall room noise.

Each dynamic environmentally actuated ceiling baffle 10 of the ceiling baffle system 100 utilizes at least one sensor 102, such as a noise sensor (three such sensors are represented in FIG. 5), along with a noise reducing baffle server 104, a noise reducing baffle database 106, a noise reducing baffle application programming interface ("API") 108, and a system user access 110. The system user access 110 is where users and programmers can access the ceiling baffle system 100 for monitoring and upgrading the software, as necessary, among other functions. The system user access 110 of the environmentally actuated ceiling baffle system 100 can be accomplished at the location of the dynamic environmentally actuated ceiling baffle 10 or remotely depending on acoustic needs.

The present disclosure will be described with reference to embodiments in which the environmentally actuated ceiling baffle system 100 utilizes multiple sensors 102 for automatically changing the configuration of the environmentally actuated ceiling baffles 10 to reduce unwanted room noise. The user's access to the environmentally actuated ceiling baffle system 100 is through connection to the environmentally actuated ceiling baffle API 108. It should be understood, however, that the present disclosure is not limited to the preferred embodiment detailed herein, rather, the system, methods and functionality illustrated and described herein may be incorporated in other ways and still fall under the scope of the present invention.

As an example of the above, a user may use one application program ("app") on a smart phone to access information about the environmentally actuated ceiling baffle 10, while a programmer may use an app to upgrade the software, and another user may use an app to manually control the room acoustics. Accordingly, the users of the environmentally actuated ceiling baffle system 100 may access the environmentally actuated ceiling baffle API 108 through the environmentally actuated ceiling baffle server 104 or through the system user access 110.

The environmentally actuated ceiling baffle system 100 (which may be referred to herein simply as "the system 100") may include and provide a graphical user interface (GUI) having a number of features described herein. Portions, or all, of the GUI may be provided by the environmentally actuated ceiling baffle server 104, in an embodiment. Accordingly, in an embodiment, the environmentally actuated ceiling baffle server 104 may be configured to perform one or more operations, methods, etc., described herein that enable various control, calculations and determinations for the system 100.

The environmentally actuated ceiling baffle server 104 may be configured to perform a number of functions to assist environmentally actuated ceiling baffle system 100 users in their decisions. For example, the environmentally actuated ceiling baffle server 104 may be configured to provide a best case scenario, based on the sensor 102 information, to reduce the unwanted room noise. The environmentally actuated ceiling baffle system 100 may determine optimal configurations based input from on a single sensor 102 or from multiple sensors 102. The routines, programs and protocols may be obtained from the environmentally actuated ceiling baffle server 104, in an embodiment, from the environmentally actuated ceiling baffle API 108 and/or from the user access 110. The ceiling baffle system 100 can be used to configure the dynamic environmentally actuated ceiling baffle 10 either automatically or programmatically as described herein, or the user can configure the dynamic environmentally actuated ceiling baffle 10 manually as needed through the user access 110 and the API 108. Additionally, an override can be incorporated so the user can configure the dynamic environmentally actuated ceiling baffle 10 by flipping a switch and controlling the length of the configuration cable 36.

As an example of the use of the sensor to establish an optimal dynamic environmentally actuated ceiling baffle 10 configuration, a noise generator, such as a white or pink noise generator may be employed in one or more locations in a particular room to emulate environmental conditions. Additional sensors may be utilized to determine the room acoustics at any one time. The dynamic environmentally actuated ceiling baffles 10 in the ceiling baffle system 100 may be configured from completely collapsed to completely expanded to determine the optimal configuration of the dynamic environmentally actuated ceiling baffles 10 based on the noise generators and additional sensors, to reduce unwanted room noise to obtain optimal acoustics.

The environmentally actuated ceiling baffle server 104 may be further configured to store information or data and to retrieve that information or data from the environmentally actuated ceiling baffle database 106. Data stored in the environmentally actuated ceiling baffle database 106 may include previous noise amplitudes, signals and responses, and environmentally actuated ceiling baffle 10 configurations based on that data, including configuring the environmentally actuated ceiling baffles 10 similarly or differently to optimize the reduction of room noise.

The environmentally actuated ceiling baffle database 106 may be or may include one or more data repositories including, but not limited to, one or more databases and database types as well as data storage that may not necessarily be colloquially referred to as a "database." The environmentally actuated ceiling baffle database 106 may be configured to store the information or data described herein, and programs that may be performed through the environmentally actuated ceiling baffle system 100, along with similar information related to the needs of the environmentally actuated ceiling baffle system 100.

The environmentally actuated ceiling baffle server 104 may be in electronic communication with the sensors 102 and with the environmentally actuated ceiling baffle system 100 users to obtain and deliver updated information, programs and routines, and other information, in an embodiment. Further, the environmentally actuated ceiling baffle server 104 may be a single server or multiple servers acting in a redundant or additive capacity, and may be located in remotely from or in close proximity to the environmentally actuated ceiling baffle system 100 or the particular environmentally actuated ceiling baffle 10.

The environmentally actuated ceiling baffle server 104 will include a processor 112 and a memory 114. The processor 112 may be any appropriate processing device, and the memory 114 may be any volatile or non-volatile computer-readable memory. The memory 114 may be configured to store instructions that embody one or more steps, methods, processes, and functions of the environmentally actuated ceiling baffle server 104 described herein. The processor 112 may be configured to execute those instructions to perform one or more of the same steps, methods, processes, and functions. Additionally, the processor 112 may be coupled to a motor 116 for releasing or letting out or drawing in the configuration cable 36 as necessary to optimize the noise reduction. The environmentally actuated ceiling baffle server 104 may be or may include a personal computer or mobile device (e.g., tablet, smartphone), in an embodiment.

Instead of, or in addition to, a processor 112 and memory 114, the environmentally actuated ceiling baffle server 104 may include a programmable logic device (PLD), application-specific integrated circuit (ASIC), or other suitable processing device (not shown).

The programs and information described herein may be provided, in an embodiment, by the environmentally actuated ceiling baffle server 104 (e.g., on a software-as-a-service (SaaS) basis). Storage and retrieval of data displayed in the environmentally actuated ceiling baffle system 100, and calculations performed by or under the system 100 may be performed by the environmentally actuated ceiling baffle server 104.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment.

Further, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional. Although numerous embodiments of this invention have been described above with a certain degree of particularity, those skilled in the art could make numerous alterations to the disclosed embodiments without departing from the spirit or scope of this disclosure.

All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A ceiling baffle comprising:

a first sidewall portion, said first sidewall portion comprising a first upper sidewall and a first lower sidewall and at least one first kerf located between said first upper sidewall and said first lower sidewall, said at least one first kerf facilitating bending of said first sidewall portion;

a second sidewall portion, said second sidewall portion comprising a second upper sidewall and a second lower sidewall and at least one second kerf located between said second upper sidewall and said second lower sidewall, said at least one second kerf facilitating bending of said second sidewall portion;

a bottom portion and a bottom portion connector;

a first top portion, a second top portion, an actuator device and a configuration cable, said actuator device located between said first top portion and said second top portion, said actuator device supporting and directing said configuration cable to said bottom portion connector where said configuration cable is connected and terminates;

wherein said first sidewall portion, said second sidewall portion, said bottom portion, said first top portion and said second top portion, combine to create an air gap; and wherein, once said ceiling baffle is attached to a ceiling structure, the air gap of the ceiling baffle can be configured and reconfigured by pulling or releasing the configuration cable using the actuator device, thereby moving the bottom portion towards and away from the first top portion and the second top portion to increase and decrease a size of the air gap.

2. The ceiling baffle of claim 1, wherein said first sidewall portion, said second sidewall portion, said bottom portion, said first top portion, and said second top portion comprise a felt material.

3. The ceiling baffle of claim 2, wherein said first sidewall portion, said second sidewall portion, said bottom portion, said first top portion, and said second top portion comprise a felt material with a thickness of 9 millimeters.

4. The ceiling baffle of claim 1, in which said first kerf and said second kerf are triangle shaped.

5. The ceiling baffle of claim 4, in which said first kerf and said second kerf are generated using a CAD/CAM process.

6. The ceiling baffle of claim 1, wherein the air gap of the ceiling baffle can be configured and reconfigured by pulling the configuration cable using the actuator device, thereby moving the bottom portion towards the first top portion and the second top portion to increase the size of the air gap.

7. The ceiling baffle of claim 1, wherein the air gap of the ceiling baffle can be configured and reconfigured by releasing the configuration cable using the actuator device, thereby moving the bottom portion away from the first top portion and the second top portion to decrease the size of the air gap.

8. The ceiling baffle of claim 1, wherein said actuator device comprises a motor.

9. The ceiling baffle of claim 8, wherein said motor is automatically controlled.

10. The ceiling baffle of claim 8, wherein said motor is programmatically controlled.

11. The ceiling baffle of claim 8, wherein said motor is manually controlled.

12. A ceiling baffle comprising:

a baffle body comprising:

a top portion;

a bottom portion;

a first sidewall portion extending between the top and bottom portions; and a second sidewall portion extending between the top and bottom portions, the first and second sidewall portions being spaced apart by an air gap that extends continuously from the top portion to the bottom portion, the air gap having a width measured between the first and second sidewall portions; and an actuation assembly comprising an actuation mechanism that is coupled to the bottom portion of the baffle body, wherein actuation of the actuation assembly causes the actuation mechanism to move the bottom portion of the baffle body towards the top portion of the baffle body during which central portions of the first and second sidewall portions located centrally between the top and bottom portions of the baffle body bend in a radial direction away from the actuation mechanism to increase the width of the air gap.

13. The ceiling baffle according to claim 12 further comprising:

the actuation mechanism comprising a configuration cable that extends between the top and bottom portions of the baffle body, the configuration cable having an end portion that is coupled to the bottom portion of the baffle body, the configuration cable having a length measured between the top and bottom portions of the baffle body; and wherein the length of the configuration cable is adjustable such that: (1) decreasing the length of the configuration cable moves the bottom portion of the baffle body towards the top portion of the baffle body and increases the width of the air gap; and (2) increasing the length of the configuration cable moves the bottom portion of the baffle body away from the top portion of the baffle body and decreases the width of the air gap.

14. The ceiling baffle according to claim 12 wherein the first sidewall portion comprises a first upper portion and a first lower portion, the central portion of the first sidewall portion being located between the first upper portion and the first lower portion, and wherein moving the bottom portion of the baffle body towards the top portion of the baffle body causes the first upper portion and the first lower portion to bend towards one another, and wherein the second sidewall portion comprises a second upper portion and a second lower portion, the central portion of the second sidewall portion being located between the second upper portion and the second lower portion, and wherein moving the bottom portion of the baffle body towards the top portion of the baffle body causes the second upper portion and the second lower portion to bend towards one another.

15. The ceiling baffle according to claim 14 further comprising a first kerf located between the first upper portion and the first lower portion of the first sidewall portion and a second kerf located between the second upper portion and the second lower portion of the second sidewall portion.

16. The ceiling baffle according to claim 12 wherein the actuation assembly comprises a motor and wherein the actuation mechanism comprises a configuration cable having a length measured between the top and bottom portions of the baffle body, and wherein activation of the motor increases or decreases the length of the configuration cable.

17. The ceiling baffle according to claim 16 wherein the baffle body is alterable between a fully collapsed configuration whereby the length of the configuration cable is a maximum length and the width of the air gap is a minimum width and a fully expanded configuration whereby the length of the configuration cable is a minimum length and the width of the air gap is a maximum width.

18. The ceiling baffle according to claim 16 further comprising at least one sensor, and wherein the length of the configuration cable is automatically adjusted based on information detected by the sensor.

19. A ceiling baffle comprising:

a baffle body comprising:

a top portion;

a bottom portion;

a first sidewall portion extending between the top and bottom portions; and a second sidewall portion extending between the top and bottom portions, a configuration cable extending between the top and bottom portions of the baffle body and having an end portion that is coupled to the bottom portion of the baffle body;

wherein the baffle body is adjustable between a fully collapsed configuration wherein outer surfaces of the first and second sidewall portions are planar and parallel to one another and a fully expanded configuration wherein the outer surfaces of the first and second sidewall portions are non-planar and non-parallel to one another by retracting and extending the configuration cable, and wherein a width of a gap measured between the first and second sidewall portions of the baffle body increases during adjustment of the baffle body from the fully collapsed configuration to the fully expanded configuration;

wherein adjusting the baffle body from the fully collapsed configuration to the fully expanded configuration comprises retracting the configuration cable, thereby moving the bottom portion of the baffle body towards the top end of the baffle body and altering the first and second sidewall portions from a straight configuration to a bent configuration; and wherein adjusting the baffle body from the fully expanded configuration to the fully collapsed configuration comprises extending the configuration cable, thereby moving the bottom portion of the baffle body away from the top end of the baffle body and causing the first and second sidewall portions to alter from the bent configuration to the straight configuration.

* * * * *